US009909902B2

(12) United States Patent
Troost et al.

(10) Patent No.: US 9,909,902 B2
(45) Date of Patent: Mar. 6, 2018

(54) SENSOR ARRANGEMENT FOR DETECTING A PEDAL MOVEMENT IN A VEHICLE

(71) Applicant: Robert Bosch GmbH, Stuttgart (DE)

(72) Inventors: Aaron Troost, Untergruppenbach (DE); Matthias Zeh, Walheim (DE); Andreas Arlt, Marbach (DE); Klaus Walter, Bietigheim-Bissingen (DE); Remigius Has, Grafenau-Daetzingen (DE)

(73) Assignee: Robert Bosch GmbH, Stuttgart (DE)

( * ) Notice: Subject to any disclaimer, the term of this patent is extended or adjusted under 35 U.S.C. 154(b) by 27 days.

(21) Appl. No.: 15/029,995

(22) PCT Filed: Sep. 22, 2014

(86) PCT No.: PCT/EP2014/070108
§ 371 (c)(1),
(2) Date: Apr. 15, 2016

(87) PCT Pub. No.: WO2015/055383
PCT Pub. Date: Apr. 23, 2015

(65) Prior Publication Data
US 2016/0252368 A1 Sep. 1, 2016

(30) Foreign Application Priority Data

Oct. 15, 2013 (DE) .................. 10 2013 220 755

(51) Int. Cl.
*G01B 7/14* (2006.01)
*G01B 7/30* (2006.01)
(Continued)

(52) U.S. Cl.
CPC ............ *G01D 5/2006* (2013.01); *B60T 7/042* (2013.01); *F16D 66/00* (2013.01); *G01D 5/202* (2013.01);
(Continued)

(58) Field of Classification Search
CPC ......................................... G01B 7/14
(Continued)

(56) References Cited

U.S. PATENT DOCUMENTS

2004/0095017 A1   5/2004   Drott et al.
2007/0139040 A1*  6/2007   Jones et al. .............. 324/207.17

FOREIGN PATENT DOCUMENTS

DE   20 2004 019 489 U1   6/2005
EP        1 231 122 A1    8/2002
(Continued)

OTHER PUBLICATIONS

Partial Translation of EP1231122 (A1), Aug. 14, 2002.*
(Continued)

*Primary Examiner* — Bot Ledynh
(74) *Attorney, Agent, or Firm* — Maginot, Moore & Beck LLP

(57) ABSTRACT

A sensor arrangement for detecting a pedal movement in a vehicle includes a measurement value transmitter that is arranged on a piston that is translated by the pedal movement and a measurement value sensor that is arranged in a stationary manner in the movement region of the piston. The measurement value sensor in connection with the measurement value transmitter generates a signal that represents the pedal movement. The measurement value transmitter and the measurement value sensor are configured as inductive sensors. The measurement value transmitter has at least one detection region, and the measurement value sensor has at least one detection coil. The at least one detection region of the measurement value transmitter influences the inductance of the at least one detection coil such that the changing inductance of the at least one detection coil of the measurement value sensor is interpreted as a measure of the pedal movement.

13 Claims, 4 Drawing Sheets

(51) Int. Cl.
  *G01D 5/20* (2006.01)
  *B60T 7/04* (2006.01)
  *F16D 66/00* (2006.01)
  *F16D 125/20* (2012.01)

(52) U.S. Cl.
  CPC ..... *G01D 5/2013* (2013.01); *F16D 2066/003* (2013.01); *F16D 2125/20* (2013.01)

(58) Field of Classification Search
  USPC .................................................. 324/207.24
  See application file for complete search history.

(56) References Cited

FOREIGN PATENT DOCUMENTS

| | | |
|---|---|---|
| EP | 1 688 709 A2 | 8/2006 |
| EP | 1 975 570 A2 | 10/2008 |
| EP | 2 028 451 A2 | 2/2009 |
| JP | 2004-526611 A | 9/2004 |
| JP | 2008-256693 A | 10/2008 |
| JP | 2013-517987 A | 5/2013 |

OTHER PUBLICATIONS

International Search Report corresponding to PCT Application No. PCT/EP2014/070108, dated Feb. 25, 2015 (German and English language document) (7 pages).

\* cited by examiner

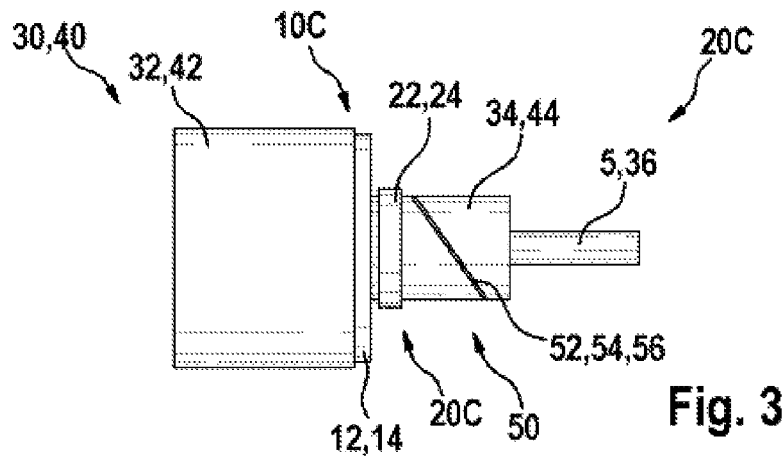
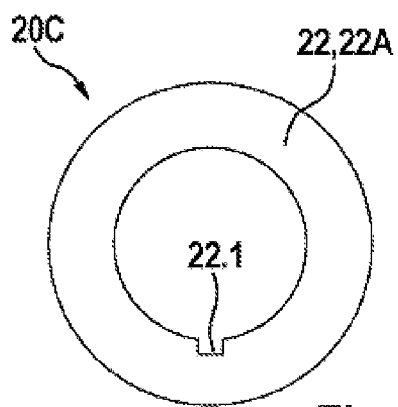
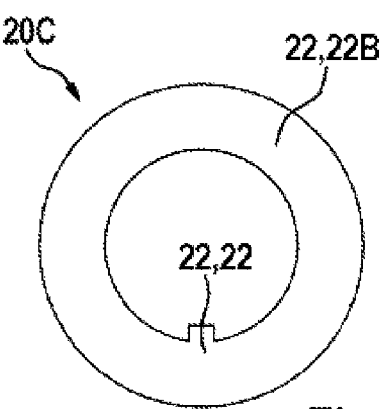
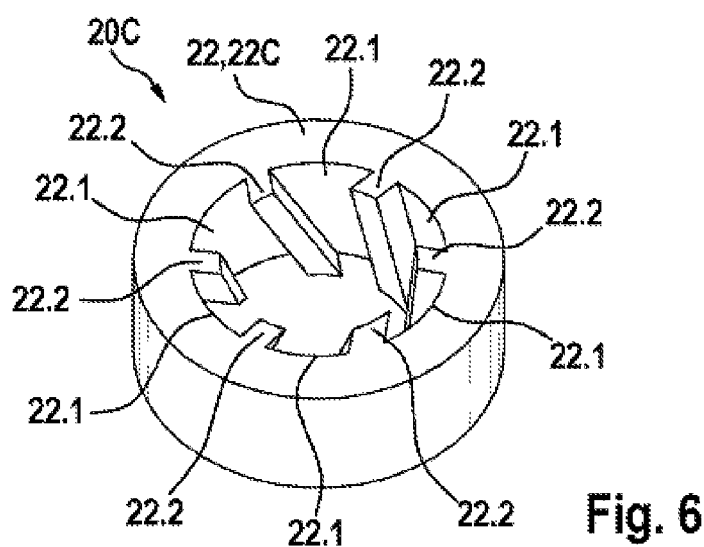

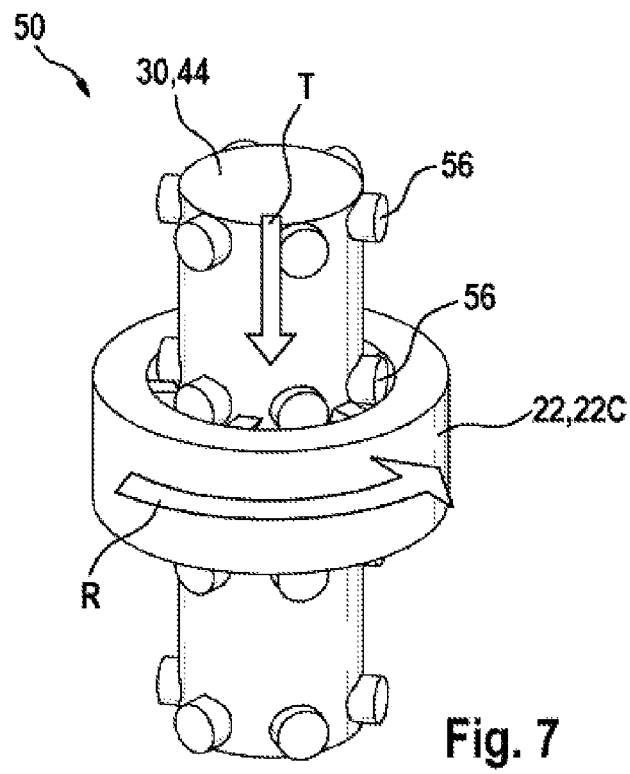
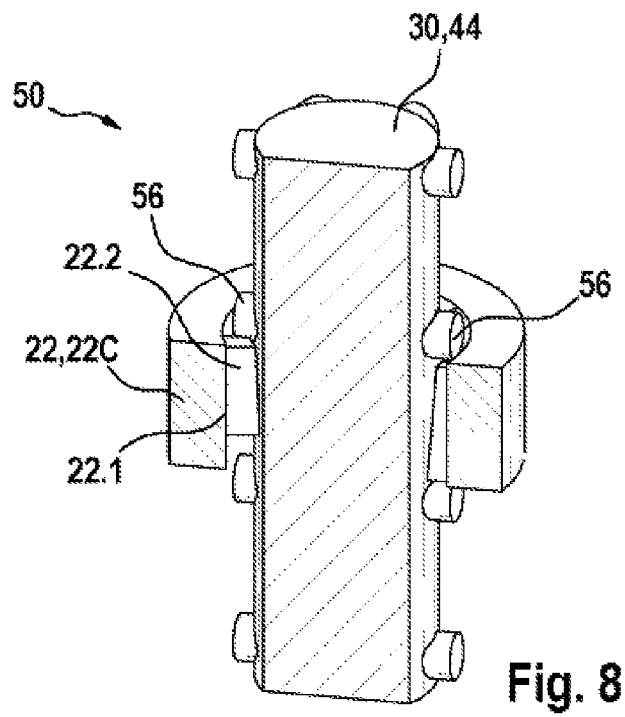

SENSOR ARRANGEMENT FOR DETECTING A PEDAL MOVEMENT IN A VEHICLE

This application is a 35 U.S.C. § 371 National Stage Application of PCT/EP2014/070108, filed on Sep. 22, 2014, which claims the benefit of priority to Serial No. DE 10 2013 220 755.7, filed on Oct. 15, 2013 in Germany, the disclosures of which are incorporated herein by reference in their entirety.

BACKGROUND

The disclosure is based on a sensor arrangement for detecting a pedal movement in a vehicle.

The prior art has disclosed brake systems for vehicles in which a braking request of the driver is detected by means of sensor arrangements by virtue of the fact that a movement of the brake pedal is detected and evaluated. In order to control a regenerative braking process in hybrid vehicles and electric vehicles it is also necessary to detect the braking request of the driver. For this purpose, for example the movement of the brake pedal is measured. The sensors which are currently used for this measure the pedal angle or the translation of the piston in the brake system. The Hall effect via which magnetic fields can be detected is used as a measuring principle, for example. The measured magnetic field is generated by one or more magnets which are coupled mechanically to the piston. In the case of translation sensors, the magnets are located in the aluminum housing of the brake system. As a result, until now other contactless measuring methods have been ruled out.

SUMMARY

The sensor arrangement according to the disclosure for detecting a pedal movement in a vehicle has, in contrast, the advantage that the measurement of the brake pedal travel is made possible by means of an inductive sensor, which measurement does not require magnetic components. Embodiments of the sensor arrangement according to the disclosure can therefore be manufactured significantly more cost-effectively and more independently of fluctuations in the costs of materials for magnets. Furthermore, part of the sensor arrangement, specifically the at least one detection coil of the measurement value sensor, can be integrated on a circuit carrier which is fitted with parts of an evaluation circuit. The installation location is selected in accordance with the implementation of the sensor arrangement according to the disclosure, since known installation locations of the conventional sensor arrangements are as a rule unsuitable owing to the metallic screening for inductive sensors.

Such inductive sensors can be embodied, for example, as eddy current sensors which utilize the effect that eddy currents which are induced by a detection coil attenuate the inductance of the respective detection coil. These eddy currents are induced in electrically conductive materials of the measurement value sensor as a function of the distance of the detection face of the measurement value transmitter from the detection coil of the measurement value sensor. The inductance is therefore a measure of the distance between the detection coil and the detection face. A reverse defect, i.e. increasing inductance when the detection face approaches the detection coil, can be achieved with detection faces made of ferromagnetic materials. In order to bypass the influence of conductive aluminum housings of a brake booster or of a master brake cylinder, a different installation location has to be found for an inductive sensor for detecting a translational movement in the pedal travel than for the current sensor principle. Therefore, the measurement value sensor with the at least one detection coil and the measurement value transmitter with the at least one detection face are arranged on the same side of the housing, preferably outside the housing, in order to simplify the formation of contact and to avoid subjecting the sensor to a medium such as, for example, brake fluid.

The embodiments of the present disclosure make available a sensor arrangement for detecting a pedal movement in a vehicle, which sensor arrangement comprises a measurement value transmitter which is arranged on a piston which is moved in a translatory fashion by the pedal movement, and a measurement value sensor which is arranged in a positionally fixed fashion in the movement range of the piston. The measurement value sensor generates, in conjunction with the measurement value transmitter, a signal which represents the pedal movement. According to the disclosure, the measurement value transmitter and the measurement value sensor are embodied as inductive sensors. In this context, the measurement value transmitter has at least one detection region, and the measurement value sensor has at least one detection coil, wherein the at least one detection region of the measurement value transmitter influences the inductance of the at least one detection coil, with the result that the changing inductance of the at least one detection coil of the measurement value sensor can be evaluated as a measure of the pedal movement.

Advantageous improvements of the sensor arrangement for detecting a pedal movement in a vehicle are possible by virtue of the measures and developments disclosed in the dependent claims.

It is particularly advantageous that the measurement value sensor has a circuit carrier on which the at least one detection coil is arranged. In addition, the at least one detection coil can be arranged distributed in a plurality of layers in the coil carrier. As a result, a relatively high level of sensitivity, i.e. a relatively large coil inductance, which is connected in series over a plurality of layers, can advantageously be achieved. The circuit carrier can preferably be arranged on the outside of the housing of a brake booster or of a master brake cylinder, in the region of a point where the piston which is moved in a translatory fashion passes through.

In one alternative advantageous refinement of the sensor arrangement according to the disclosure, the at least one detection coil can be arranged on an inner wall of the housing of a master brake cylinder. As a result, the translatory piston movement which is brought about by activation of the brakes can be detected in an advantageous way within the master brake cylinder.

In a further advantageous refinement of the sensor arrangement according to the disclosure, the circuit carrier can be embodied, for example, as a circuit board and/or flexible film and/or plastic injection molded part with multilayer conductor track routing or load structuring. As a result, the sensor arrangement according to the disclosure can be adapted to various installation conditions.

In a further advantageous refinement of the sensor arrangement according to the disclosure, the measurement value transmitter can have an annular base body which is fitted onto the piston which is moved in a translatory fashion, and the at least one detection region is arranged on the surface of said base body. The at least one detection region may be composed, for example, of an electrically conductive material and/or a ferromagnetic material. A plurality of detection regions can preferably be arranged on the surface of the base body, wherein adjacent detection regions are each separated from one another by a separating region composed of an insulating material.

In a further advantageous refinement of the sensor arrangement according to the disclosure, a movement transducer can convert the translational movement of the piston into a rotational movement of the measurement value transmitter, which rotational movement can be evaluated as a measure of the pedal movement. As a result, the necessary installation space for detecting the pedal movement can advantageously be reduced. The measurement value transmitter can be arranged at a predefined axial distance from the measurement value sensor and can be coupled in a rotational fashion to the piston via the movement transducer.

Exemplary embodiments of the disclosure are illustrated in the drawings and will be explained in more detail in the following description. In the drawings, identical reference symbols denote components or elements which carry out the same or analogous functions.

BRIEF DESCRIPTION OF THE DRAWINGS

FIG. 3 shows a schematic block illustration of a third exemplary embodiment of a sensor arrangement according to the disclosure for detecting a pedal movement.

FIG. 4 shows a schematic illustration of a first exemplary embodiment of a measurement value transmitter for the sensor arrangement according to the disclosure for detecting a pedal movement according to FIG. 3.

FIG. 5 shows a schematic illustration of a second exemplary embodiment of a measurement value transmitter for the sensor arrangement according to the disclosure for detecting a pedal movement according to FIG. 3.

FIG. 6 shows a schematic perspective illustration of a third exemplary embodiment of a measurement value transmitter for the sensor arrangement according to the disclosure for detecting a pedal movement according to FIG. 3.

FIG. 7 shows a schematic perspective illustration of a movement transducer for the sensor unit according to the disclosure according to FIG. 3 with the measurement value sensor according to FIG. 6.

FIG. 8 shows a schematic, perspective sectional illustration of the movement transducer according to FIG. 7.

DETAILED DESCRIPTION

Figure 1:
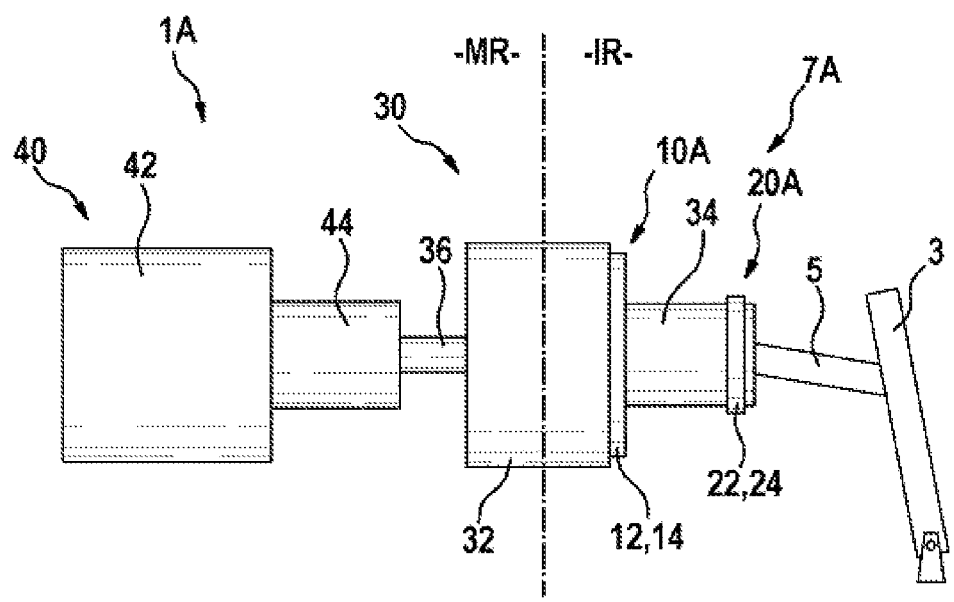
FIG. 1 shows a schematic block illustration of a first exemplary embodiment of a sensor arrangement according to the disclosure for detecting a pedal movement.

As is apparent from FIGS. 1 to 10, the illustrated exemplary embodiments of a sensor arrangement 7A, 7B, 7D according to the disclosure for detecting a pedal movement in a vehicle each comprise a measurement value transmitter 20A, 20B, 20C, 20D which is arranged on a piston 34, 44 which is moved in a translatory fashion by the pedal movement, and a measurement value sensor 10A, 10B, 10C, 10D which is arranged in a positionally fixed fashion in the movement range of the piston 34, 44, wherein the measurement value sensor 10A, 10B, 10C, 10D generates, in conjunction with the measurement value transmitter 20A, 20B, 20C, 20D, a signal which represents the pedal movement. According to the disclosure, the measurement value transmitter 20A, 20B, 20C, 20D and the measurement value sensor 10A, 10B, 10C, 10D are embodied as inductive sensors. In this context, the measurement value transmitter 20A, 20B, 20C, 20D has at least one detection region 24, and the measurement value sensor 10A, 10B, 10C, 10D has at least one detection coil 14. In this context, the at least one detection region 24 of the measurement value transmitter 20A, 20B, 20C, 20D influences the inductance of the at least one detection coil 14, with the result that the changing inductance of the at least one detection coil 14 of the measurement value sensor 10A, 10B, 10C, 10D can be evaluated as a measure for the pedal movement.

The sensor arrangement 7A, 7B, 7C, 7D according to the disclosure for detecting a pedal movement is preferably used to detect the braking request of the driver for the actuation of the brake system 1A, 1B. In addition, the sensor arrangement 7A, 7B, 7D according to the disclosure for detecting a pedal movement can also be used in a regenerative brake system in a hybrid vehicle and/or electric vehicle. For this purpose, the sensor arrangement 7A, 7B, 7D according to the disclosure is used to measure the movement of a brake pedal 3. In the illustrated exemplary embodiments, the brake pedal 2 is connected via a coupling element 5 to a movable piston 34 of a brake booster 30. The brake booster 30 is connected via a further coupling element 36 to the movable piston 44 of a master brake cylinder 40.

The embodiments of the present disclosure permit the measurement of the brake pedal travel by means of cost-effective inductive sensors which are constructed without magnetic components. The measurement value sensor 10A, 10B, 10C, 10D preferably has a circuit carrier 12 on which the at least one detection coil 14 is arranged. The at least one detection coil 14 can be distributed in a plurality of layers in the circuit carrier 12 in order to achieve a relatively high sensitivity, i.e. a relatively large coil inductance which is connected in series by means of a plurality of layers. The circuit carrier 12 is embodied, for example, as a circuit board and/or flexible film and/or plastic injection molded part with multi-layer conductor track routing or load structuring. The measurement value transmitter 20A, 20B, 20C, 20D has an annular base body 22 which is fitted onto the piston 34, 44, which is moved in a translatory fashion, and the at least one detection region 24 is arranged on the surface of said base body. The at least one detection region 24 is composed of an electrically conductive material and/or of a ferromagnetic material. As a rule, a plurality of detection regions 24 are arranged on the surface of the base body 22, wherein adjacent detection regions are each separated by a separation region composed of an insulating material. Inductive sensors which are embodied as Eddy current sensors utilize the effect that eddy currents which are induced by a detection coil 14 attenuate the inductance of the respective detection coil 14. These eddy currents are induced in the at least one detection region 24 of the measurement value transmitter 20A, 20B, 20C, 20D as a function of the distance from the at least one detection coil 14, said measurement value transmitter 20A, 20B, 20C, 20D being composed of an electrically conductive material. The inductance of the detection coil 14 is therefore a measure of the distance between the detection coil 14 and the detection region 24 of the measurement value transmitter 20A, 20B, 20C, 20D. The reverse effect, i.e. rising inductance of the induction coil 14 when the at least one detection region 24 of the measurement value transmitter 20A, 20B, 20C, 20D approaches the detection coil 14, can be achieved by manufacturing the at least one detection region 24 of the inductive sensor from a ferromagnetic material.

Figure 2:
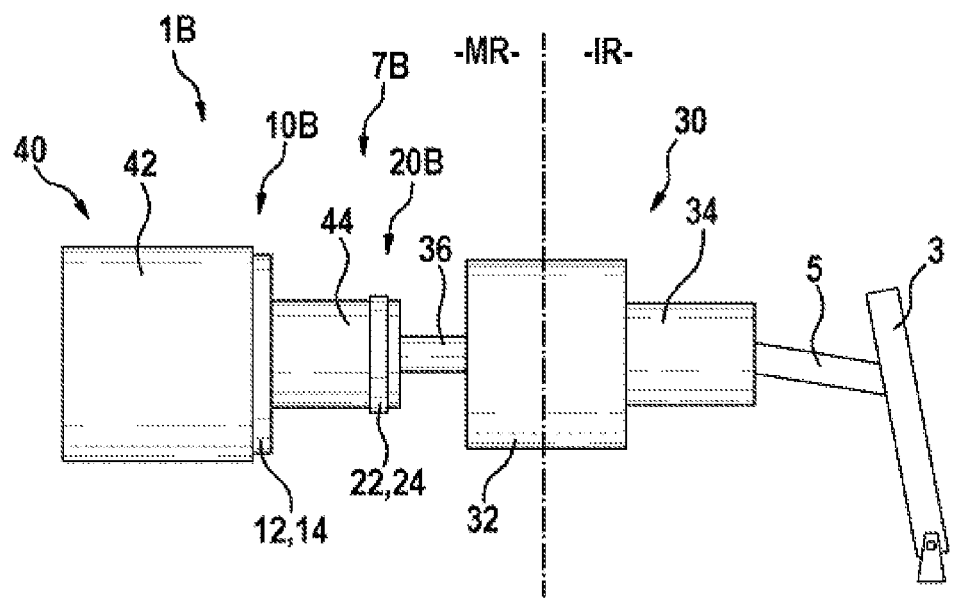
FIG. 2 shows a schematic block illustration of a second exemplary embodiment of a sensor arrangement according to the disclosure for detecting a pedal movement.

As is also apparent from FIGS. 1 to 3, in the illustrated exemplary embodiments of the sensor arrangement 7A, 7B according to the disclosure for detecting a pedal movement, the circuit carrier 12 is arranged on the outside of the housing 32, 42 of the brake booster 30 or of the master brake cylinder 40, in the region of a point where the piston 34, 44 which is moved in a translatory fashion passes through.

As is also apparent from FIG. 1, the Eddy current sensor, formed from the measurement value sensor 10A and the measurement value transmitter 20A, in the illustrated exemplary embodiment of the sensor arrangement 7A according to the disclosure for detecting a pedal movement in the passenger compartment IR of the vehicle is installed on the brake system 1A. The circuit carrier 12 which is embodied as a circuit board and which has the at least one detection coil 14 is mounted on the housing 32 of the brake booster 30 around the entry point of the piston 34 into the brake booster 30 and is surrounded by a plastic housing (not illustrated). The measurement value transmitter 20A is mounted at the end of the piston 34 and moves along with the piston 34. As a result, the inductance of the at least one detection coil 14 changes as a result of the piston 34 dipping into the brake booster 30.

A further installation location for the inductive sensor which is constructed from the measurement value sensor 10B and the measurement value transmitter 20B is illustrated in FIG. 2. The junction between the brake booster 30 and the master brake cylinder 40 in the engine cavity MR of the vehicle provides similar conditions to the junction between the brake pedal 3 and the brake booster 30 in the passenger compartment IR of the vehicle. As is also apparent from FIG. 2, the inductive sensor which is formed from the measurement value sensor 10B and the measurement value transmitter 20B in the illustrated second exemplary embodiment of the sensor arrangement 7B according to the disclosure for detecting a pedal movement in the engine cavity MR of the vehicle is installed on the brake system 1B. The circuit carrier 12 which is embodied as a printed circuit board and has the at least one detection coil 14 is mounted on the housing 40 of the master brake cylinder 40 about the entry point of the piston 44 into the master brake cylinder 40 and is surrounded by a plastic housing (not illustrated). In a way analogous to the first exemplary embodiment, the measurement value transmitter 20B is mounted at the end of the piston 44 and moves along with the piston 44. As a result, the inductance of the at least one detection coil 14 changes as a result of the piston 44 dipping into the master brake cylinder 40.

As is also apparent from FIGS. 3 to 9, in order to reduce the installation space the translation T of the piston 34, 44 can also be converted into a rotation R of the measurement value transmitter 20C which is structured for this purpose. In order to convert the translational movement T of the piston 34, 44 into a rotational movement R of the measurement value transmitter 20C, the piston 34, 44 can be embodied with a groove 52 or a rail 54. The shape of the base body 22 of the measurement value transmitter 20C is adapted to the embodiment of the piston 34, 44 with a groove 52 or a rail 54.

As is also apparent from FIG. 4, the disk-shaped base body 22A in the illustrated exemplary embodiment has, on the inner circumference, a guide path 22.1 which interacts with the rail 54 on the piston 34, 44 in order to cause the measurement value transmitter 20C to execute a rotational movement R when there is a translational movement T of the piston 34, 44. As a result of the measurement value transmitter 20C being secured at a constant distance from the circuit board 12, the translational movement T of the piston 34, 44 forces the base body 22B to undergo rotation R.

As is also apparent from FIG. 5, the disk-shaped base body 22B in the illustrated exemplary embodiment has, on the inner circumference, a web 22.2 which interacts with the groove 52 on the piston 34, 44, in order to cause the measurement value transmitter 20C to execute a rotational movement R when there is a translational movement T of the piston 34, 44. In this exemplary embodiment, the translational movement T of the piston 34, 44 also forces the base body 22B to undergo rotation R owing to the securement of the measurement value transmitter 20C at a constant distance from the circuit board 12.

FIGS. 6 to 8 show a further possible way of converting a translation T into a rotation R. In this context, instead of the groove 52 or rail 54, the process relies on a plurality of protrusions 56 on the piston 34, 44 which, as the base body 22C of the measurement value transmitter 20C passes through, move said measurement value transmitter 20C so that it undergoes rotation R. As is also apparent from FIGS. 6 to 8, the base body 22C has a plurality of guide paths 22.1 and webs 22.2

The structuring of the measurement value transmitter 20C in order to influence the inductance of the measurement value sensor 10C is carried out by means of detection faces 24 composed of an electrically conducting material, between which detection faces 24 faces composed of an electrically non-conducting material are arranged so that a rotation can be detected by means of a plurality of detection coils 14 of the measurement value sensor 10C.

Figure 9:
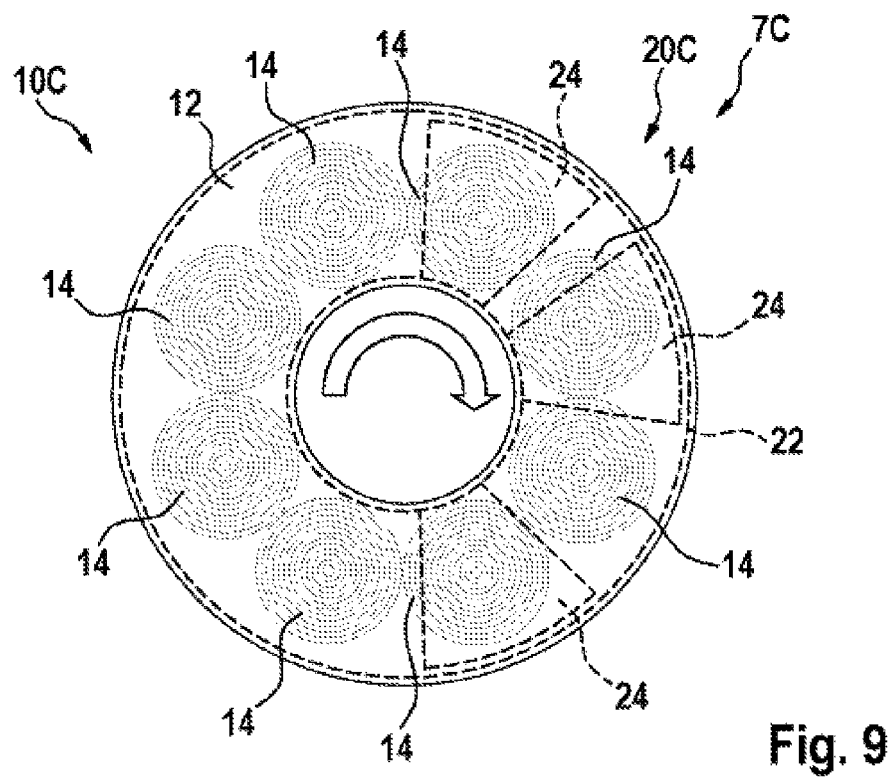
FIG. 9 shows a schematic illustration of a measurement value sensor for the sensor arrangement for detecting a pedal movement according to FIG. 3.

FIG. 9 shows a possible embodiment of the measurement value sensor 20C with eight detection coils 14 arranged on a circuit carrier 12. The corresponding measurement value transmitter 20C which rotates in the direction R of the arrow comprises a disk-shaped base body 22 (illustrated by dashed lines) with three detection faces 24 composed of an electrically conductive material. Of course, a multiplicity of other suitable arrangements of the at least one detection coil 14 and the at least one detection face 24 can also be implemented. The reduction in the installation space through the use of a movement transducer 50 is possible both for the installation on the brake booster 30 as well as for the installation on the master brake cylinder 40.

Figure 10:
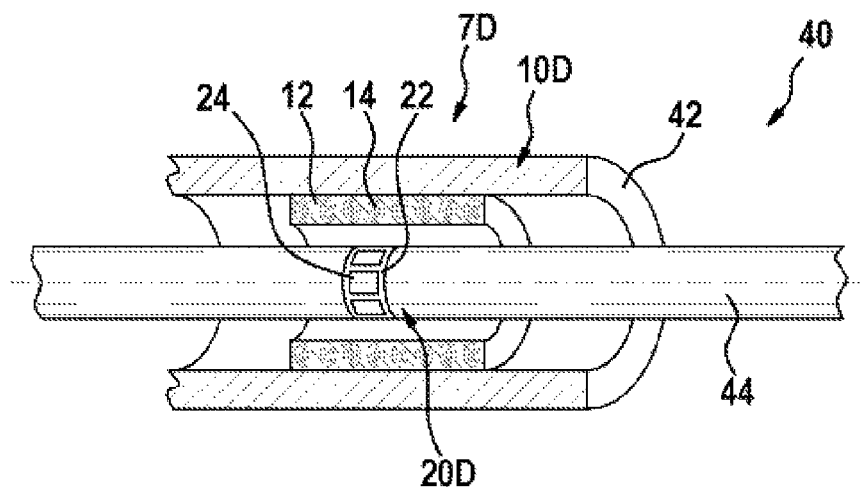
FIG. 10 shows a schematic perspective sectional illustration of a fourth exemplary embodiment of a sensor arrangement according to the disclosure for detecting a pedal movement.

As is also apparent from FIG. 10, in the illustrated third exemplary embodiment of the sensor arrangement 7D according to the disclosure for detecting a pedal movement, the inductive sensor which is formed from the measurement value sensor 10D and the measurement value transmitter 20D is installed in the interior of the master brake cylinder 40.

The circuit carrier 12 which is embodied, for example, as a flexible printed circuit board and which has the at least one detection coil 14 is arranged on an inner wall of the housing 42 of the master brake cylinder 40. The base body 22 of the measurement value transmitter 20D with a plurality of detection faces 24 is arranged on the piston 44 and moves along with the piston 44. As a result, the inductance of the at least one detection coil 14 changes. The turns of the at least one detection coil 14 on the circuit carrier 12, which is embodied as a flexible circuit board, can also be embodied redundantly. As an alternative to a solution as a flexible circuit board, the circuit carrier can also be integrated into the housing 42 of the master brake cylinder 40 if the housing 42 is embodied, for example, as a plastic injection molded part with multi-layer conductor track routing or load structuring.

The invention claimed is:

1. A sensor arrangement for detecting a pedal movement in a vehicle, comprising:
   a measurement value transmitter arranged on a piston that is configured to be moved in a translatory fashion by the pedal movement; and
   a measurement value sensor arranged in a positionally fixed fashion in the movement range of the piston, the measurement value sensor generating, in conjunction with the measurement value transmitter, a signal that represents the pedal movement,
   wherein the measurement value transmitter and the measurement value sensor are configured as inductive sensors, the measurement value transmitter having a plurality of detection regions, and the measurement value sensor having at least one detection coil,
   wherein the at least one detection region of the measurement value transmitter influences the inductance of the at least one detection coil such that the changing inductance of the at least one detection coil of the measurement value sensor is configured to be evaluated as a measure of the pedal movement, and
   wherein the measurement value transmitter has an annular base body that is fitted onto the piston, the plurality of detection regions arranged on the surface of the base body with adjacent detection regions separated from one another by a separation region composed of an insulating material.

2. The sensor arrangement as claimed in claim 1, wherein the measurement value sensor has a circuit carrier, and the at least one detection coil is arranged on the circuit carrier.

3. The sensor arrangement as claimed in claim 2, wherein the at least one detection coil is arranged distributed in a plurality of layers in the coil carrier.

4. The sensor arrangement as claimed in claim 2, wherein the circuit carrier is arranged on the outside of a housing of a brake booster or of a master brake cylinder in a region of a point where the piston passes through.

5. The sensor arrangement as claimed in claim 1, wherein the at least one detection coil is arranged on an inner wall of the housing of a master brake cylinder.

6. The sensor arrangement as claimed in claim 2, wherein the circuit carrier is embodied as a one or more of a circuit board, flexible film, and plastic injection molded part with multi-layer conductor track routing or load structuring.

7. The sensor arrangement as claimed in claim 1, wherein the plurality of detection regions is composed of one or more of an electrically conductive material and a ferromagnetic material.

8. A sensor arrangement comprising:
   a measurement value transmitter arranged on a piston that is configured to be moved in a translatory fashion by the pedal movement; and
   a measurement value sensor arranged in a positionally fixed fashion in the movement range of the piston, the measurement value sensor generating, in conjunction with the measurement value transmitter, a signal that represents the pedal movement,
   wherein the measurement value transmitter and the measurement value sensor are configured as inductive sensors, the measurement value transmitter having at least one detection region, and the measurement value sensor having at least one detection coil,
   wherein the at least one detection region of the measurement value transmitter influences the inductance of the at least one detection coil such that the changing inductance of the at least one detection coil of the measurement value sensor is configured to be evaluated as a measure of the pedal movement, and
   wherein a movement transducer converts the translational movement of the piston into a rotational movement of the measurement value transmitter, and wherein the rotational movement is configured to be evaluated as a measure of the pedal movement.

9. The sensor arrangement as claimed in claim 8, wherein the measurement value transmitter is arranged at a predefined axial distance from the measurement value sensor and is coupled in a rotational fashion to the piston via the movement transducer.

10. A vehicle, comprising:
    a brake booster;
    a master brake cylinder; and
    a sensor arrangement for detecting a pedal movement in the vehicle, the sensor arrangement including:
      a measurement value transmitter arranged on a piston that is configured to be moved relative to one or more of the brake booster and the master brake cylinder in a translatory fashion by the pedal movement, and
      a measurement value sensor arranged in a positionally fixed fashion in the movement range of the piston, the measurement value sensor generating, in conjunction with the measurement value transmitter, a signal that represents the pedal movement,
      wherein the measurement value transmitter and the measurement value sensor are configured as inductive sensors, the measurement value transmitter having at least one detection region, and the measurement value sensor having at least one detection coil,
      wherein the at least one detection region of the measurement value transmitter influences the inductance of the at least one detection coil such that the changing inductance of the at least one detection coil of the measurement value sensor is configured to be evaluated as a measure of the pedal movement, and
      wherein a movement transducer converts the translational movement of the piston into a rotational movement of the measurement value transmitter, and wherein the rotational movement is configured to be evaluated as a measure of the pedal movement.

11. The vehicle as claimed in claim 10, wherein the measurement value sensor has a circuit carrier arranged on the outside of a housing of the brake booster or of the master brake cylinder in a region of a point where the piston passes through, the at least one detection coil arranged on the circuit carrier.

12. The vehicle as claimed in claim 10, wherein the at least one detection coil is arranged on an inner wall of a housing of the master brake cylinder.

13. A sensor arrangement for detecting a pedal movement in a vehicle, comprising:
    a measurement value transmitter arranged on a piston that is configured to be moved in a translatory fashion by the pedal movement; and
    a measurement value sensor arranged in a positionally fixed fashion in the movement range of the piston, the measurement value sensor generating, in conjunction with the measurement value transmitter, a signal that represents the pedal movement,
    wherein the measurement value transmitter and the measurement value sensor are configured as inductive sensors, the measurement value transmitter having at least one detection region, and the measurement value sensor having at least one detection coil, wherein the at least one detection region of the measurement value transmitter influences the inductance of the at least one detection coil such that the changing inductance of the at least one detection coil of the measurement value sensor is configured to be evaluated as a measure of the pedal movement, and wherein the at least one detection coil is arranged on an inner wall of the housing of a master brake cylinder.

* * * * *